United States Patent [19]

Menon et al.

[11] Patent Number: 5,346,872
[45] Date of Patent: Sep. 13, 1994

[54] COCATALYST FOR VANADIUM/TITANIUM CONTAINING POLYMERIZATION CATALYST

[75] Inventors: Raghu Menon, West Chester; Albert P. Masino, Hamilton; Mark K. Reinking, Mason, all of Ohio

[73] Assignee: Quantum Chemical Corporation, Cincinnati, Ohio

[21] Appl. No.: 10,737

[22] Filed: Jan. 29, 1993

[51] Int. Cl.$^5$ ............................................. B01J 31/00
[52] U.S. Cl. .................................. 502/116; 502/113; 502/115; 502/119; 502/120
[58] Field of Search ............... 502/113, 115, 116, 119, 502/120

[56] References Cited

U.S. PATENT DOCUMENTS

| | | |
|---|---|---|
| 4,004,071 | 1/1977 | Aishima et al. |
| 4,250,287 | 2/1981 | Matlack . |
| 4,374,753 | 2/1983 | Pullukat et al. |
| 4,451,688 | 5/1984 | Kuroda et al. |
| 4,530,913 | 7/1985 | Pullukat et al. |
| 4,831,000 | 5/1989 | Miro . |
| 4,866,021 | 9/1989 | Miro et al. |
| 4,912,074 | 3/1990 | Miro . |
| 4,972,033 | 11/1990 | Miro . |
| 5,006,618 | 4/1991 | Miro . |
| 5,051,388 | 9/1991 | Buehler et al. .................. 502/113 |
| 5,104,949 | 4/1992 | Buehler et al. .................. 502/113 |

*Primary Examiner*—Anthony McFarlane
*Assistant Examiner*—E. D. Irzinski
*Attorney, Agent, or Firm*—William A. Heidrich

[57] ABSTRACT

The present invention relates to a novel catalyst component for ethylene polymerization comprising vanadium and titanium. Moreover, when the vanadium/titanium containing catalyst of the present invention is employed with an aluminum-containing cocatalyst enhanced activity as well as melt index is obtained.

The present invention is directed to a novel halosilane cocatalyst component which, when used in conjunction with an aluminum containing cocatalyst, is effective in increasing the activity of a silica supported titanium/vanadium containing solid catalyst component in the polymerization of ethylene and/or α-olefins. In addition to the increased catalytic activity, the polymers produced by the present invention exhibit improved melt index values compared with melt index values typically obtained using prior art catalyst systems. Thus, the catalyst system of the instant invention represent an advancement in the art in view of the combination of increased activity, i.e., yield of polymer produced, and physical properties of the polyolefin product.

In another aspect of the present invention, a process for polymerizing ethylene and/or α-olefins is disclosed. In this process at least one olefin is polymerized under olefin polymerization conditions utilizing the catalyst system of the present invention, which includes the solid catalyst component of the present invention, along with the first cocatalyst, an aluminum-containing compound, and the second cocatalyst, a halosilane.

16 Claims, No Drawings

COCATALYST FOR VANADIUM/TITANIUM CONTAINING POLYMERIZATION CATALYST

FIELD OF INVENTION

The present invention relates to a novel catalyst component for transition metal containing ethylene polymerization catalysts comprising vanadium and titanium containing compounds.

The present invention also relates to an improved Ziegler-Natta type catalyst system wherein the solid catalyst component is reacted with aluminum-containing cocatalyst and a halosilane cocatalyst during polymerization of an α-olefins. More specifically, the instant invention relates to a novel halosilane cocatalyst which, when used in conjunction with an aluminum-containing cocatalyst, is effective for increasing the activity of the novel silica supported vanadium/titanium containing solid catalyst in the polymerization of ethylene.

BACKGROUND OF INVENTION

Ziegler-Natta catalysts, which usually consists of compounds of Group IV-VIB metals and organometallic compounds of Groups I-IIIA of the Periodic Table of Elements, are widely utilized, in the polymerization of olefins. These catalysts are known to effectively promote the polymerization of olefins in high yield to form polymers that possess many desirable characteristics. However, the use of these conventional Ziegler-Natta catalyst systems are subject to important failings. Thus, new and improved catalysts are continually being sought.

Commonly in the polymerization of α-olefins a catalyst system having a magnesium halide support is utilized. Unfortunately, when polyolefins which are synthesized using such catalyst systems are processed into molded articles, the molding apparatus used in processing this polymer can be subjected to corrosion. This corrosion is caused by the presence of residual halide in the polymer product. More significantly, this adverse effect of corrosion is not limited to damaging just the molding apparatus. More importantly, the polymeric molded article processed by such corroded apparatus is often characterized as having undesirable aesthetic flaws.

The activity of a polymerization catalyst is defined as the weight of the polymer produced per weight of catalyst. Those skilled in the art are aware that the effect of higher activity not only reduces the amount of catalyst required for the polymerization process, but, more importantly, translates into lower catalyst concentration in the final polymeric product, usually resulting in a higher purity product.

One way of achieving higher catalytic activity without negatively effecting the physical characteristics of the polymer is to introduce co-catalysts or activators to the solid catalyst component during the polymerization process.

Typically, one skilled in the art adds one or more organoaluminum co-catalysts to the solid catalyst component during the polymerization of α-olefins. These co-catalysts are known to increase the activity of the polymerization catalyst without adversely effecting the physical properties of the resultant polymeric product.

U.S. Pat. No. 4,451,688 discloses a process for preparing a polyolefin wherein an olefin is polymerized in the presence of a catalyst system which comprises a solid component which is the reaction product of a magnesium-containing compound and a titanium and/or vanadium-containing compound. A second catalyst component is a silicon-containing compound having the structural formula $R'_m Si(OR'')_n X_{4-m-n}$, where $R'$ and $R''$ are each hydrocarbon radicals having 1 to 24 carbon atoms; X is a halogen atom; m is 0 or an integer of 1 to 3; and n is an integer of 1 to 4. The catalyst system also includes a third catalyst component, an organometallic compound in which the metal of the organometallic compound is preferably aluminum or zinc.

U.S. Pat. No. 4,374,753 is directed to a solid catalyst component in which any one of a broad range of organic silicon compounds is disclosed on a silica or alumina support having surface hydroxyl groups. To this product is added an organomagnesium compound and an alcohol. The sequence of contact with the organomagnesium compound and the alcohol is random. The product of contact of these two components, independent of the sequence of their contact with the support, is reacted with a halide or alkoxide of titanium, vanadium, zirconium or mixtures thereof. The resultant solid catalyst component is employed with an alkyl or aryl aluminum co-catalyst to provide an olefin polymerization catalyst system.

U.S. Pat. No. 4,250,287 to Matlack relates to a solid catalyst component useful for polymerizing 1-olefins. The catalyst component is composed of a titanium halide deposited on an anhydrous magnesium halide-support and an activator component composed of a trialkylaluminum and an alkyl ester of an aromatic carboxylic acid. The productivity of the catalyst is increased by including a halosilane in the activator component.

U.S. Pat. No. 4,866,021 to Miro et al. provides a vanadium and a titanium-containing catalyst composition which produces high density, high molecular weight α-olefin polymers having a relatively broad molecular weight distribution. The catalyst component is produced by contacting a solid, porous carrier sequentially with a metal or a compound of a metal of Group IIB of the Periodic Chart of the Elements, e.g., a zinc compound, a halogen-containing aluminum compound, a vanadium compound and a titanium compound. The catalyst precursor is then combined with a suitable co-catalyst such as an alkyl aluminum compound and a halogenating agent. Suitable halogenated agents include methylene chloride, chloroform, carbon tetrachloride, dichlorosilane, trichlorosilane and silicon tetrachloride.

U.S. Pat. No. 4,831,000 to Miro is directed to a catalyst composition for the polymerization of olefins, particularly alpha-olefins. The composition is prepared by synthesizing a catalyst precursor and then combining it with a conventional catalyst activator. The precursor is synthesized by contacting a solid, porous carrier with an aluminum compound; contacting the resulting product with a mixture of vanadium and titanium compounds; contacting the product with an ether; and, pre-activating the product with a mixture of a halogenating agent and an aluminum compound. During polymerization, a halogenating agent may be used to obtain broad molecular weight distribution LLDPE and HDPE products. In another embodiment, the catalyst composition is used without a halogenating agent to obtain narrow molecular weight distribution HDPE and LLDPE products.

U.S. Pat. No. 4,912,074 to Miro, which is a continuation-in-part of U.S. Pat. No. 4,831,000 relates to a similar catalyst composition as U.S. Pat. No. 4,831,000; however, the pre-activating step has been omitted.

U.S. Pat. No. 4,972,033 to Miro relates to a catalyst composition for the polymerization of olefins. The composition is prepared by contacting a solid, porous carrier with an aluminum compound; contacting the resulting product with a mixture of vanadium and titanium compounds; contacting the product with an alkyl ether and, pre-activating the catalyst with a mixture of a halogenating agent and an aluminum compound. The catalyst is used without a halogenating agent in the polymerization medium to produce narrow molecular weight distribution HDPE and LLDPE products, or with a halogenating agent in the polymerization medium to produce broad molecular weight distribution LLDPE and HDPE products.

U.S. Pat. No. 5,006,618 to Miro, which is a divisional of U.S. Pat. No. 4,921,074 which was a continuation-in-part of U.S. Pat. No. 4,831,000, disclosed a catalyst composition for the polymerization of olefins, particularly alpha-olefins. The composition is prepared by contacting a solid, porous carrier with an aluminum compound; contacting the resulting product with a mixture of vanadium and titanium compounds; and, contacting the product with an ether. The catalyst composition is used with a conventional activator and, preferably, a halogensting agent in the polymerization medium to produce broad molecular weight distribution, high molecular weight HDPE or medium density, broad molecular weight distribution, high molecular weight resins which can be made into high strength films.

SUMMARY OF THE INVENTION

The present invention relates to a novel catalyst component for transition metal containing ethylene polymerization catalysts comprising vanadium and titanium containing compounds.

The present invention is also directed to a novel halosilane cocatalyst component which, when used in conjunction with an aluminum containing cocatalyst, is effective in increasing the activity of a silica supported vanadium/titanium containing solid catalyst component in the polymerization of α-olefins. In addition to the increased catalytic activity, the polymers produced by the present invention exhibit improved melt index values compared with melt index values typically obtained using prior art catalyst systems. Thus, the catalyst system of the instant invention represent an advance in the art in view of the combination of increased activity, i.e., yield of polymer produced, and physical properties of the polyolefin product.

In accordance with the present invention, a catalyst and a catalyst system is provided which comprises initially contacting a support of a regular form and organic nature (for example, styrene polymers) or inorganic nature (microspheroidel silica, for instance) with at least one hydrocarbon soluble magnesium-containing compound or a magnesium aluminum complex. The supported magnesium-containing compound or complex is then reacted simultaneously or in successive steps of no particular order with a titanium-containing compound and a vanadium-containing compound to obtain the novel catalyst of the present invention.

The titanium compound of the present invention is represented by the following formula $TiX^1_p(OR')_q$ wherein R' is aryl, alkyl aralkyl, cycloalkyl or alkylsiyl; X is halogen; p is an integer from 1 to 4; and q is 0 or an integer from 1 to 3 with the proviso that the sum of p and q is 4.

The vanadium-containing compound of the present invention is represented by the following formula $V(OR)_x(O)_y(X^2)_z$ wherein R is hydrocarbyl having from 1 to 18 carbon atoms; $X^2$ is halogen; x is 0 or an integer from 1 to 5; and y is 0 or 1; and $z=(5-x-2y)$ or 4 or 3 when x=0, y=0.

The above-obtained solid catalyst component is then reacted with an aluminum-containing first cocatalyst and in a preferred embodiment with a aluminum-containing cocatalyst and a halosilane second cocatalyst during polymerization. The aluminum-containing cocatalyst compounds are conventional aluminum cocatalyst well known in the art, e.g. aluminum alkyls.

The novel halosilane cocatalyst component to be used in the present catalyst system is a halosilane compound having the structural formula $R_a^3SiX_b^3$ wherein $X^3$ is halogen; $R^3$ is hydrogen, alkoxy, aryloxy, alkyl, silyloxy, aryl or cycloalkyl; a is 0 or an integer from 1 to 3; and b is an integer from 1 to 4 with the proviso that the sum of a and b is 4.

In another aspect of the present invention, a process for polymerizing α-olefins is disclosed. In this process at least one olefin is polymerized under olefin polymerization conditions utilizing the catalyst system of the present invention, which includes the solid catalyst component of the present invention, and a first cocatalyst, an aluminum-containing compound, and a second cocatalyst, a halosilane.

DETAILED DESCRIPTION OF THE INVENTION

The preferred solid catalyst component utilized in the present catalyst system is prepared by initially contacting a porous, inorganic oxide support, such as silica, with at least one hydrocarbon soluble magnesium compound or a magnesium aluminum complex and at least one modifying compound.

A preferred support is silica that has a high surface area and high pore volume. The silica employed in the current catalyst system is preferably pure however, it may contain minor amounts of other inorganic oxides. In general, the silica support comprises at least 90%–95% by weight pure silica. In one preferred embodiment the silica is at least 99% pure.

The silica support utilized in the preparation of the catalyst, is preferably a high surface area, high pore volume material defined by a surface area between 50 m²/g and about 500 m²/gm; a median size of about 20 microns to about 200 microns and a pore volume of about 0.5 cc/gm to about 3.0 cc/gm as determined by Standard B.E.T. measurements.

It is a preferred embodiment of the invention that the silica support be pretreated prior to its use to remove any impurities or surface hydroxyl groups which may inhibit the activity of the resultant catalyst component.

To cause effective removal of surface hydroxyl groups from the surface of the silica support, the silica may be calcined in an inert atmosphere at a temperature of at least 150° C. Preferably, calcination of the silica is performed in the temperature range from about 150° C. to about 650° C. in an inert gas atmosphere, i.e. nitrogen or argon.

Another method of removing surface hydroxy groups involves contacting the silica with a hexaalkyl disilazane or chlorosilanes as disclosed in U.S. Pat. No. 4,530,913 of Pullukat et al., for example. Of the hexaalkyl disilazane useful in this application, hexamethyl disilazane, i.e., H.M.D.S., is particularly preferred.

The silica may also be pretreated by combining the calcination method and treatment with a hexalkyl disilazane. In this method, the sequence of pretreatment may be random; however, it is a preferred embodiment that the hexaalkyl disilazane treatment precede the calcination process.

In a preferred embodiment, the surface-modified silica is then contacted with at least one hydrocarbon soluble magnesium-containing compound or a magnesium aluminum complex. Hydrocarbon soluble magnesium compounds that are suitable in the instant invention include magnesium compunds having the structural formula ROMgX, where R=$C_1$ to $C_{12}$ hydrocarbyl and X is a halogen, preferably chloride; dihydrocarbyl magnesium; alkylmagnesium halides and mixtures thereof. Preferably, the magnesium compounds are magnesium alkoxides, alkoxymagnesium halides and mixtures thereof. Especially preferred magnesium compounds contemplated for use in the preparation of the solid catalyst compound of the present invention include 2-methylpentyloxymagnesium chloride, pentyloxymagnesium chloride, 2-ethylhexyloxy-magnesium chloride, di-2-ethylhexyloxymagnesium and mixtures thereof. Of these, 2-ethylhexyloxymagnesium chloride and 2-methylpentyloxymagnesium chloride are particularly preferred.

The alkoxy magnesium compounds are commonly associated with about 0.8 moles/mole of a related free alcohol(s) (that is, in the case of 2-methyl 1-pentoxy magnesium halide, 2-methyl-1-pentanol).

The concentration of hydrocarbon soluble magnesium- containing compound is from about 0.1 to about 10 mmol per g of silica. More preferably, the concentration is from about 0.5 to about 5 mmol per g $SiO_2$.

The magnesium aluminum complexes employed by the present invention are characterized as having the structural formula $(MgRR')_m(AlR''_3)_n$ where R, R' and R" are the same or different alkyl group and the ratio of m/n is from about 0.5 to about 10 inclusive. In a preferred embodiment, this ratio of m/n be between about 2 and 10.

The alkyl group R, R' and R" may be the same or different, and each has from about 2 to about 12 carbon atoms. When the R groups are identical, it is preferred that each has about 4 carbon atoms. Suitable R groups which meet this requirement are preferably butyl or hexyl groups. The alkyl groups R' are preferably ethyl groups.

The concentration of the magnesium-aluminum complex is from about 0.1 to about 10 mmol per gram of $SiO_2$. More preferably, the concentration of the magnesium-aluminum complex is from about 0.3 to about 2.0 mmole per gram of $SiO_2$.

The magnesium-aluminum complex is known in the art, as disclosed in Aishima et al. U.S. Pat. No. 4,004,071 (Jan. 18, 1977) at col. 2, 11. 34–40 and col. 3, 11 30–36. The complex is readily prepared according to the teachings of Ziegler et al., Organometallic Compounds XXII: Organomagnesium-Aluminum Complex Compounds, Annalen der Chemie, Vol. 605. pages 93–97 (1957).

The reaction mixture containing the magnesium-aluminum complex and silica is then treated with about 0.1 to about 10 mmol of an alcohol per gram of silica. More preferably the concentration of alcohol per gram of silica is from about 0.1 to about 10 mmol.

The contacting step between the silica and the soluble magnesium compounds usually occurs at a temperature in the range of between about 15° C. and about 120° C. More preferably, this contact occurs at a temperature in the range of between about 50° C. and 110° C. The contact occurs over a period of between about 30 minutes and about 4 hours. Preferably, the contact occurs over a period of between about 1 hour and about 3½ hours. Still more preferably, this contact occurs over a period of between about 1½ hours and about 2½ hours.

The hydrocarbon solvent employed to solubilize the magnesium-containing compounds can be any aliphatic or aromatic hydrocarbon solvents containing from 5 to 15 C-atoms. In a preferred embodiment, aliphatic hydrocarbon solvents such as pentane, heptane, hexane, cyclohexane and the like are used to solubilize the magnesium compound. Of these solvents, heptane is most preferred.

Prior to use, the hydrocarbon solvent should be purified, e.g. by percolation through silica gel and/or molecular sieves to remove trace quantities of water, oxygen, polar compounds, and other materials capable of adversely affecting the catalyst activity.

Furthermore, all of the contacting steps described herein are carried out in an inert atmosphere, such as nitrogen or argon; thus, preventing any air or moisture to come into direct contact with the solid catalyst.

In yet another preferred embodiment, the reaction product of the magnesium component and silica component is then dried under precisely defined conditions until most of the heptane solvent is removed. The drying process utilized by the present invention has been previously described in copending and coassigned patent application U.S. Ser. No. 854,199 filed Mar. 20, 1992, the contents of which are incorporated herein by reference. This drying process is effective in providing effective wetting of the surface area of said compound such that a regular essentially continuous distribution of accessible magnesium values is present on the support material for further reaction. The process provides a surface coverage of magnesium values of about 1 to about 3 layers.

Typically, drying will be conducted under an atmosphere of and with a slow purge e.g. 10 ml/min. of nitrogen; in small volumes the granular coated support may be dried in a paddle stirred container with heat supplied from an external source.

In addition to the silica being contacted by at least one hydrocarbon soluble magnesium-containing compound or magnesium aluminum complex, the silica containing the magnesium may also contact a modifying compound selected from the group consisting of silicon halides, having the structural formula $SiX^4_4$, boron halides having the structural formula $BX^5_3$, aluminum halides having the structural formula $AlX^6_3$, where $X^4$, $X^5$, and $X^6$ are the same or different and are halogen, and mixtures thereof. Preferably, $X^4$, $X^5$, and $X^6$ are the same or different and are chlorine, fluorine or bromine. Thus, it is preferred that the modifying compound be silicon tetrachloride, silicon tetrabromide, boron trichloride, boron tribromide, aluminum trichloride, aluminum tribromide or mixtures thereof. It is more preferred that $X^4$, $X^5$, and $X^6$ be chlorine. Thus, it is more preferred that the modifying compound be silicon tetrachloride, boron trichloride, aluminum trichloride or mixtures thereof. Of these, silicon tetrachloride is most preferred.

The concentration of the modifying compound preferably utilized in the formation of the catalyst is from 0.1 to about 10 mmol/g SiO$_2$. More preferably, the concentration of modifying compound to 1 gram of silica is 0.5 to 5.0 mmol. The contact between the modifying compound and the silica supported magnesium-containing compound occurs at a temperature from about 0° C. to about 100° C. over a time period of about 30 minutes and about 2 hours. More preferably, this contacting step occurs over at time period of about 45 minutes to about 1½ hours at a temperature of about 50° C. to 75° C.

It is noted that although the contact between the modifying component and the hydrocarbon soluble magnesium compound are discussed in the order described above, the sequence of silica treatment involving these two catalyst compounds is independent. In other words, pretreated silica may be in contact with the modifier prior to its contact with the magnesium compound.

In another preferred embodiment, the solid product obtained so far may be washed several times with an appropriate organic solvent to remove any reagents that are not substantially absorbed onto the support material. It is preferred that the solvent be a hydrocarbon, either aliphatic or aromatic. Of these hydrocarbons, alkanes containing 5 to 15 carbon atoms like pentane, hexane, cyclohexane, heptane, decane, etc., are more preferred.

In the washing step, the product is immersed in the solvent with stirring at ambient temperature. After which the stirring is stopped and the mixture is allowed to settle. The solvent is thereafter removed from the solid product by filtration, decanting, siphoning or the like.

The solid product containing the soluble hydrocarbon magnesium containing compound or magnesium aluminum complex is then reacted simultaneously or in successive steps of no particular order with a titanium-containing compound and a vanadium containing compound.

The solid product of this contacting step is contacted with a vanadium-containing compound having the structural formula V(OR)$_x$(O)$_y$(X$^2$)$_z$ wherein R is a hydrocarbyl having from 1 to 18 carbon atoms; X$^2$ is halogen; x is 0 or an integer from 1 to 5; and y is 0 or 1; and z=(5−x−2y) or 4 or 3 when x=0, y=0.

Suitable vanadium compounds encompassed by the formula include vanadium oxyhalides, vanadium alkoxides, vanadium carboxylates, vanadium halides and mixtures thereof. It is especially preferred that the vanadium-containing compound be vanadium tributyloxy, triisobutyl vanadate, vanadium tetrachloride, and the like thereof.

This contact occurs at a temperature from about 0 to about 100° C. More preferably, the temperature of this contacting step is from 20 to about 100° C. Most preferably, the temperature is from about 25° to about 50° C.

The time employed for contacting the solid product with the vanadium-containing compound is from about 0.25 to about 4 hrs. Most preferably, the time of this contacting step is from about 0.25 to about 1 hr.

The concentration of vanadium-containing compound employed is from about 0.05 to about 10 mmol of vanadium compound per gram of silica. More preferably, the concentration of vanadium-containing compound used in this contacting step is from about 0.1 to about 5 mmol of vanadium compound per gram SiO$_2$.

The solid is then reacted with a titanium-containing compound having the structural formula TiX$^1_p$(OR')$_q$ wherein R' is aryl, alkyl, aralkyl, cycloalkyl or alkylsilyl; X is a halogen; p is an integer from 1 to 4; and q is 0 or an integer from 1 to 3; with the proviso that the sum of p and q is 4.

In a preferred embodiment, the titanium-containing compound is characterized as "p" being an integer from 2 to 4 and q is 0 or an integer 1 or 2. Suitable titanium compounds within the contemplation of this embodiment are titanium tetrachloride, titanium tetrabromide, methoxytitanium trichloride, ethoxytitanium trichloride, diethoxytitanium dichloride and the like.

Still, more preferably, the titanium-containing compound is defined by "p" being 4, "q" being 0, and X' is chlorine or bromine. Thus, the titanium compound is most preferably titanium tetrachloride or titanium tetrabromide. Of these two titanium compounds, titanium tetrachloride is most preferred.

The reaction between the solid component and the titanium-containing compound occurs at a temperature from about 0° C. to about 150° C. More preferably, the temperature of this contacting step is in the temperature range from about 50° C. to about 120° C. Most preferably, the temperature is from about 80° C. to about 100° C.

The time employed for contacting the solid product with the titanium containing component is from about 0.1 hrs to about 5.0 hrs. More preferably, the contacting step occurs over a time period of about 0.2 hrs to about 3.0 hrs. Most preferably the time duration of this contacting step is between 0.5 hrs to about 1.5 hrs.

It should be appreciated that all the treatment steps in the formation of the catalyst of this invention, the contact of silica with the hydrocarbon soluble magnesium compound or the magnesium aluminum complex, the modifying compound, vanadium-containing compound and the titanium-containing compound, involve contact between a solid, silica, and a liquid. This is because each of the compounds that are contacted with silica are liquids or a soluble in an inert hydrocarbon solvent under the conditions employed by the present process. As such, no ball-milling or other solid mixing is required. Ball milling is an expensive and difficult operation, usual in the formation of polymerization catalysts of the prior art; it is thus. eliminated. Those skilled in the art are aware, in the case where a hydrocarbon solvent is employed, that the solvent may be allowed to remain with the reaction mass or can be removed by decantation, filtration, evaporation, or the like.

The solid catalyst component produced herein is then contacted under polymerization reaction conditions with a first cocatalyst component. In a preferred embodiment, the solid catalyst component is contacted under polymerization condition with a first cocatalyst component and a second cocatalyst component.

The first cocatalyst of the catalyst system is an aluminum-containing compound. The aluminum-containing compound is preferably an alkylaluminum-containing compound. Alkylaluminum-containing compounds suitable for the present process include trialkylaluminum, alkylaluminum halide, alkylaluminum hydride, aluminoxane or mixtures thereof. More preferably, the cocatalyst is a trialkylaluminum. Of the trialkylaluminums, triethylaluminum and triisobutylaluminum are particularly preferred.

The second cocatalyst of the catalyst system is preferably at least one halosilane compound having the structural formula $R^3{}_a SiX^3{}_b$ wherein $X^3$ is a halogen $R^3$ is hydrogen, alkoxy, aryloxy, alkyl, aryl, cycloalkyl or silyoxy; a is an integer from 0 to 3; and b is an integer from 1 to 4 with the proviso that a and b is 4. It should be also recognized that compounds of other Group IVB elements of the Periodic Table of Elements, excluding C, may be used instead of Si in the instant invention.

Of the halosilanes contemplated by the present invention, trichlorosilane, silicon tetrachloride, and trimethylchlorosilane are particularly preferred.

In the preferred embodiment, the molar ratio of halosilane to the aluminum-containing cocatalyst is from 0.1 to about 200. More preferably, the concentration ratio of halosilane to first cocatalyst component is from about 1 to about 100. Based on solid catalyst component, the molar ratio of aluminum cocatalyst:halosilane cocatalyst:solid catalyst is from about 1:1:1 to about 1000:1000:1. More preferably, the molar ratio is defined from about 10:10:1 to about 300:300:1.

Our invention may also be utilized in conjunction with the practice of copending and coassigned application Ser. No. 011,046 of Menon et al., filed Jan. 29, 1993 concurrently filed of the same inventive entity and incorporated herein by reference. That is the invention can be used alone as described herein or in conjunction with the embodiments of the copending application.

In still another aspect of the present invention a process for polymerizing an olefin is set forth. This process comprises polymerizing at least one olefin under olefin polymerization conditions in the presence of the catalyst system of the present invention. That is, in the presence of the solid catalyst, the first cocatalyst and the second cocatalysts of the instant invention.

Olefins suitable in this process include α-olefins containing from two to twelve carbon atoms such as ethylene, propylene, butene, pentene, and the like.

In a particularly preferred embodiment of the present invention, the olefin polymerized is ethylene.

In this preferred embodiment, polymerization of ethylene occurs at a temperature in the range of between about 40° C. and 250° C. More preferably, the temperature of this reaction is in the range of about 50° C. and about 150° C. The pressure of the ethylene polymerization reaction is in the range of between about 50 psig and about 1000 psig, more preferably between about 100 psig and about 700 psig. In a preferred embodiment the ethylene polymerization occurs in the presence of hydrogen gas.

The resultant polymeric product obtained from the process is characterized as being essentially pure due to the low concentration of magnesium, titanium and vanadium values in the solid catalyst component. Furthermore, the resultant polymeric product obtained from the present process exhibits an unexpected improvement in the polymer melt index compared with prior art polymers. Those skilled in the art are aware that ethylene polymerization are adversely affected in catalyst activity where higher melt index resins are synthesized. Thus, maintaining catalyst activity while increasing the polymer melt index is considered a significant improvement in catalyst performance. By employing the present catalyst, it is possible to obtain an improved polymer product while maintaining comparable catalyst activity of prior art systems.

The following examples are given to illustrate the scope of this invention. Because these examples are given for illustrative purposes only, the invention embodied therein should not be limited thereto.

EXAMPLE I

Solid Catalyst Preparation

Into a 250 ml, four-necked round bottom flask, purged with nitrogen gas free of oxygen and moisture, was placed 1 g silica (Davison 948) which had been previously treated with about 20 wt. % of hexamethyl disilazane, and dried under a nitrogen purge (200 ml/min) at 150° C. for 60 min. The silica utilized in this example was characterized by standard B.E.T. method as having a surface area of about 200 m²/g, a median particle size of about 50 microns, and a pore volume of about 1.3 cc/g.

The pretreated silica was then impregnated with 5 mmol of 2-methylpentyloxymagnesium chloride in a solution of purified heptane. The contents of the flask was thereupon heated to 60° C. under a purge of nitrogen (150 ml/min) and was maintained at this temperature for 30 minutes. Continuous stirring was conducted throughout the impregnating process. The temperature was then raised to 80° C. and maintained at this temperature, with continuous stirring under a nitrogen purge for 30 minutes. Thereafter, the temperature of the reaction vessel was raised to 95° C. and maintained at this temperature for about 30 min. During this time period most of the heptane solvent was removed. The reaction vessel was then cooled to ambient temperature and the resultant white solid product was at incipient wetness and possessed an appearance that is describable as having a flour-like consistency.

To this reaction product, 5 mmol of silicon tetrachloride in 18 ml of heptane was added. The contents of the reaction flask were heated to 60° C. for a period of about 0.5 hrs. At the end of this time period stirring and heating was discontinued, and 75 ml of heptane was added to the mixture.

The solid product of this contacting was allowed to settle and the supernatant liquid was siphoned off. The solid was washed three times in heptane. In each washing cycle 75 ml heptane was added to the solid with stirring. After a few minutes, stirring was discontinued and the solid product was allowed to settle, and the heptane solvent siphoned off.

To the thus washed solid product, 1.6 mmol of triisobutyl vanadate in a heptane solution (5 ml) was added.

The triisobutyl vanadate solution was added at ambient temperature. After which, titanium tetrachloride (18 mmol) was introduced into the flask. This addition again occurred at ambient temperature. The flask and its contents were then heated, at a temperature between 80° C. and 95° C. for 1 hr. At the conclusion of this period the solid product was washed six times in heptane (as described above) and then dried under a $N_2$ purge (200 ml/min).

The solid product resulting from the above procedure was a green-brown free-flowing, spherically-shaped solid catalyst component. It was determined by analyses that the solid catalyst component contained 4.23% Ti, 1.66% V and 4.95% Mg, said percentages being by weight, based on total weight of the solid catalyst.

Polymerization of Ethylene

The solid catalyst component obtained above was then utilized in the polymerization of ethylene. That is, a 2-l Autoclave Engineers (Trademark) reactor was charged with 120.0 mg of solid catalyst component. In addition, triethylaluminum (TEAL) was included in concentrations such that the molar ratio of TEAL:Ti:V was 22.6:1(Ti):0.4(V). The ethylene polymerization reaction was conducted at a total pressure of 600 psig at 93.3 in 1 L of isobutane slurry. A pressure drop of 150 psig of $H_2$ from a 150 ml vessel was added. Ethylene was fed on demand for 1 hr with continuous stirring.

The polymerization data for this reaction is summarized in Table I.

COMPARATIVE EXAMPLE I, CEI

The solid catalyst was prepared in accordance with Example I however, 0.5 mmol of titanium tetracreyslate was used in place of the vanadium-containing compound. The polymerization data is illustrated in Table I. It was determined by analyses that the solid catalyst component contained 3.01% Ti and 5.05% Mg.

The results of this example show that the melt index, i.e. M.I., of the resultant polymer can be improved from 0.41 to 8.9 g/10 when a vanadium-containing compound is employed in place of titanium tetracresylate.

EXAMPLE II

Into a 250 ml, four-necked round bottom flask, purged with nitrogen gas free or oxygen and moisture, was placed 1 g silica (Davison 948) which had been previously treated with about 20 wt. % of hexamethyl disilazane, and dried under a nitrogen purge (200 ml/min) at 150° C. for 60 min. The silica utilized in this example was characterized by standard B.E.T. method as having a surface area of 200 m²/g, a median particle size of 50 microns, and a pore volume of 1.3 cc/g.

The pretreated silica was then impregnated with 1 mmol of 2-methylpentyloxymagnesium chloride in a solution of purified heptane. The contents of the flask was thereupon heated at 60° C. under a purge of nitrogen (150 ml/min) and was maintained at this temperature for 30 minutes. Continuous stirring was conducted throughout the impregnating process. The temperature was then raised to 80° C. and maintained at this temperature, with continuous stirring under a nitrogen purge for 30 minutes. Thereafter, the temperature of the reaction vessel was raised to 95° C. and maintained at this temperature for about 30 min. During this time period most of the heptane solvent was removed. The reaction vessel was then cooled to ambient temperature and the resultant white solid product was at incipient wetness and appears to have an appearance that is describable as having a flour-like consistency.

To this reaction product, 1 mmol of silicon tetrachloride in 18 ml of heptane was added. The contents of the reaction flask were heated to 60° C. for a period of about 0.5 hrs. At the end of this time period stirring and heating was discontinued, and 75 ml of hepatne was added to the mixture.

The solid product of this contacting was allowed to settle and the supernatant liquid was siphoned off. The solid was washed three times in heptane. In each washing cycle 75 ml heptane was added to the solid with stirring. After a few minutes, stirring was discontinued and the solid product was allowed to settle. After which, the heptane solvent was siphoned off.

To the thus washed solid product was added 0.015 mmol of triisobutyl vanadate in a heptane solution (5 ml) was added.

The triisobutyl vanadate solution was added at ambient temperature. After which, titanium tetrachloride (0.55 mmol) was introduced into the flask. This addition again occurred at ambient temperature. The flask and its contents were then heated, at a temperature between 80° C. and 95° C. for 1 hr. At the conclusion of this period the solid product was washed six times in heptane and then dried under a $N_2$ purge (200 ml/min).

The solid product resulting from the above procedure was a green-brown free-flowing, spherically-shaped solid catalyst component. It was determined by analyses that the solid catalyst component contained 2.41% Ti, 0.1% V and 1.52% Mg, said. percentages being by weight, based on total weight of the solid catalyst.

The polymerization data using this solid catalyst is shown in Table I. The results of this example show that improved MI and activity can be obtained using the catalyst of the present invention compared to prior art catalyst that contain only a titanium-containing compound.

EXAMPLE III

The solid catalyst was made in accordance with Example II except that 0.15 mmol of $VCl_4$ was used in place of the triisobutyl vanadate compound. It was determined by analyses that the catalyst component contained 2.54 wt. % Ti, 0.55 wt. % V and 1.74 wt. % Mg. The polymerization data using this solid catalyst is summarized in Table I.

The results indicate that improved MI from 0.41 to 1.56 can be obtained by employing the catalyst of the present invention compared to prior art catalyst which contains a titanium-containing compound.

TABLE I

| POLYMERIZATION OF ETHYLENE WITH VI CATALYST SYSTEM | | | | | | | | |
|---|---|---|---|---|---|---|---|---|
| Examples | Charge (mg) | [TEA] (mmol/L) | YLD (g) | ACT. (g/gh) | MI (g/10) | HLMI | Ti ppm | V ppm |
| I | 120 | 2.4 | 151 | 1263 | 8.9 | NA | 8.6 | 2.7 |
| II | 47.0 | 0.8 | 104 | 2215 | 1.2 | 38.1 | 20 | 5.7 |
| III | 83.3 | 1.6 | 116 | 1396 | 1.56 | 51.0 | 16 | 4.2 |
| CE1 | 93.0 | 2.40 | 137 | 1398 | 0.41 | 13.5 | 14.6 | none |

EXAMPLE IV

Polymerization of Ethylene

The solid catalyst component obtained by the preparative method described in Example I was then utilized in the polymerization of ethylene. That is, a 2-1 Autoclave Engineers (Trademark) reactor was charged with 82.3 mg of solid catalyst component. In addition, triethylaluminum (TEAL) and silicon tetrachloride cocatalysts were included in concentrations such that the molar ratio of TEAL:SiCl4:Ti:V was 33:5:1:0.4. The ethylene polymerization reaction was conducted at a total pressure of 600 psig at 93° C. in 1 L of isobutane slurry. A pressure drop of 150 psig of $H_2$ from a 150 ml vessel was added. Ethylene was fed on demand for 1 hr with continuous stirring.

The polymerization data for this reaction is summarized in Table II.

COMPARATIVE EXAMPLE II, CE2

The solid catalyst component was prepared in accordance with the procedure described in Example I, however, during polymerization no halosilane component was added to the solid catalyst. The polymerization data obtained using this catalyst system is summarized in Table II.

The results show a 34% increase in the catalytic activity occurs when a halosilane is added as a cocatalyst component during polymerization. Furthermore, when silicon tetrachloride was used in conjunction with TEAL, the resultant polymeric product had a M.I. of 12.7 as compared to M.I. of 8.9 when no halosilane compound is used as a cocatalyst component.

EXAMPLE V

The solid catalyst component was prepared in accordance with the procedure described in Example I, however, during polymerization the halosilane component was trichlorosilane. The results of this. experiment are summarized in Table II.

COMPARATIVE EXAMPLE III, CE3

The solid catalyst component was prepared in accordance to Example I, however, during the polymerization process $CCl_4$ was used in place of the halosilane cocatalyst. The results of this example are summarized in Table II. The results indicate that the activity of the catalyst decreased 49% when a halocarbon compound is used as a cocatalyst rather than a halosilane component. Moreover, the use of a halocarbon compound as a cocatalyst resulted in a decrease in the M.I. value of the resultant resin from 20.4 to 0.17.

Ethylene was fed on demand for 1 hr with continuous stirring.

The polymerization data for this reaction is summarized in Table II.

COMPARATIVE EXAMPLE IV, CE4

The solid catalyst component was prepared in accordance with Example II, however, no halosilane cocatalyst was added during ethylene polymerization. In other words, the addition of trichlorosilane was omitted during the polymerization process. The polymerization data is summarized in Table II.

The results of this example show a 3.5% increase in the catalytic activity of the system when a halosilane compound is employed as a cocatalyst component. Additionally, the M.I. of the resultant polymer product increased from 0.81 to 1.19 when a halosilane compound is used as the cocatalyst component.

EXAMPLE VII

A solid catalyst component was prepared in accordance with Example III. Polymerization of ethylene was conducted in accordance with Example VI. In other words, TEAL and trichlorosilane were added as cocatalysts during polymerization. The results of this experiment are illustrated in Table II.

COMPARATIVE EXAMPLE V, CE5

The solid catalyst component used was the same as described in Example III, and polymerization conditions as described in Example V, however, no halosilane cocatalyst component was added during polymerization.

These data demonstrate the physical properties, i.e. MI and HLMI of the polymeric product were enhanced by employing a halosilane compound as a cocatalyst.

TABLE II
POLYMERIZATION OF ETHYLENE WITH HALOSILANE COCATALYST SYSTEM

| Examples | Charge (mg) | [TEA] (mmol/L) | [SILN] (mmol/L) | YLD (g) | ACT. (g/gh) | MI | HLMI |
| --- | --- | --- | --- | --- | --- | --- | --- |
| IV | 82.3 | 2.4 | 0.35$^a$ | 139.7 | 1698 | 12.7 | — |
| CE2 | 120.0 | 2.4 | none | 151.5 | 1263 | 8.9 | — |
| V | 116.4 | 2.4 | 1.4$^b$ | 166.1 | 1427 | 20.4 | — |
| CE3 | 115.0 | 2.4 | 0.5$^c$ | 84.1 (70 min.) | 731 | 0.17 | 22.2 |
| VI | 117.0 | 0.8 | 0.5$^b$ | 104.1 | 2215 | 1.19 | 38.1 |
| CE4 | 56.0 | 1.6 | none | 119.9 | 2141 | 0.81 | 35.6 |
| VII | 88.5 | 1.6 | 0.5$^b$ | 118.7 | 1341 | 2.85 | 86.6 |
| CE5 | 83.3 | 1.6 | none | 116.3 | 1396 | 1.56 | 51.0 |

$^a$represents $SiCl_4$
$^b$represents $HSiCl_3$
$^c$represents $CCl_4$

EXAMPLE VI

Polymerization of Ethylene

The solid catalyst component obtained in Example 2 was then utilized in the polymerization of ethylene. That is, a 2l Autoclave Engineers (Trademark) reactor was charged with 117 mg of solid catalyst component. In addition, triethylaluminum (TEAL) and trichlorosilane cocatalysts were included in concentrations such that the molar ratio of TEAL:trichlorosilane:Ti:V was 13.6(A1):8.5(Si):1.0(Ti):0.04(V). The ethylene polymerization reaction was conducted at a total pressure of 500 psig at 93.3° C. in 1 L of isobutane slurry. A pressure drop of 150 psig of $H_2$ from a 150 ml vessel was added.

The above embodiments and examples are given to illustrate the scope and spirit of the present invention. These embodiments and examples will make apparent, to those skilled in the art, other embodiments and examples. These other embodiments and examples are within the contemplation of the present invention; therefore, the instant invention should be limited only by the appended claims.

What is claimed is:

1. A catalyst component for ethylene polymerization consisting essentially of a solid product obtained by the steps of:
   (a) pretreating a silica support to remove surface hydroxyl groups;

(b) contacting said pretreated silica support with a magnesium-containing compound selected from the group consisting of magnesium compounds havng the formula ROMgX, where R is a $C_1$ to $C_{12}$ hydrocarbyl and X is a halogen; dihydrocarbyloxy magnesium, alkylmagnesium halides; magnesium aluminum-complexes having the formula $(MgRR')_m (AlR_3)_n$ where R, R' and R" are the same or different and are alkyl groups and the ratio of m/n is from about 0.5 to 10; and mixtures thereof;

(c) drying the reaction mixture obtained in step (b) to form a solid product;

(d) contacting said dried solid product of step (c) with at least one modifying compound selected from the group consiting of silicon halides, boron halides, aluminum halides, alkyl silicon halides, and mixtures thereof;

(e) washing said product of step (d) with a hydrocarbon solvent; and (f) reacting the product of step (e) interchangeably or simultaneously with a vanadium-containing compound having the formula $V(OR)_x(O)_y(X^2)_z$ wherein R is a hydrocarbyl having from 1 to 18 carbon atoms; $X^2$ is halogen; x is 0 or an integer from 1 to 5; y is 0 or 1; and $z=(5-x-2y)$ or 4 or 3 when $x=0$, $y=0$; and titanium-containing compound having the structural formula $TiX^1_p(OR^1)_q$ where X is halogen; $R^1$ is aryl, alkyl, aralkyl, cycloalkyl or alkylsilyl; p is an integer from 1 to 4; q is 0 or an integer from 1 to 3; and the sum of p and q is 4.

2. The catalyst component of claim 1 wherein the ROMgX compound is 2-methylpentyloxymagnesium chloride.

3. The catalyst component of claim 1 wherein the compound having the structural formula $TiX^1_p(OR^1)_q$ is selected from the group consisting of tetrahalotitaniums, alkoxytitanium trihalides, dialkoxytitanium dihalides, and mixtures thereof.

4. The catalyst component of claim 4 wherein p is 4, g is 0, and X is chloride.

5. The catalyst component of claim 4 wherein the titanium compound is titanium tetrachloride.

6. The catalyst component of claim 1 wherein said vanadium compound is selected from the group consisting of vanadium oxyhalides, vanadium alkoxides, vanadium carboxylates vanadium halides and mixtures thereof.

7. An improved catalyst system for polymerizing α-olefins consisting essentially of a silica supported titanium/vanadium solid catalyst component prepared by the steps of:

(a) pretrating a silica support to remove surface hydroxyl groups;

(b) contacting said pretreated silica support with a magnesium-containing compound selected from the group consisting of hydrocarbyloxy magnesium halides having the formula ROMgX, where R is a $C_1$ to $C_{12}$ hydrocarbyl and X is a halogen; dihydrocarbyloxy magnesium; alkylmagnesium halides; magnesium aluminum-complexes having the formula $(MgRR')_m(AlR_3")_n$ wherein R, R' and R" are the same or different and are alkyl groups and the ratio of m/n is from about 0.05 to about 10; and mixtures thereof;

(c) drying the reaction mixture obtained in step (b) to form a solid product;

(d) contacting said dried solid product of step (c) with at least one modifying compound selected from the group consisting of silicon halides, boron halides, aluminum halides, alkyl silicon halides, and mixtures thereof;

(e) washing said product of step (d) with a hydrocarbon solvent;

(f) reacting the product of step (e) interchangeably or simultaneously with a vanadium-containing compound having the formula $V(OR)_x(O)_y(X^2)_z$ wherein R is a hydrocarbyl having from 1 to 18 carbon atoms; $X^2$ is halogen; x is 0 or an integer from 1 to 5; y is 0 or 1; and $z=(2-x-2y)$ or 4 or 3 when $x=0$, $y=0$; and a titanium-containing compound having the structural formula $TiX^1_p(OR^1)_q$ where X is halogen; $R^1$ is aryl, alkyl, aralkyl, cycloalkyl or alkysilyl; p is an integer from 1 to 4; q is 0 or an integer from 1 to 3; and the sum of p and q is 4; and (g) adding an alkylaluminum first cocatalyst component, and at least one halosilane second cocatalyst component having the formula $R^3_aSiX^3_b$ where $X^3$ is halogen; $R^3$ is hydrogen, alkoxy, alkyl, aryl, silyloxy or cycloalkyl; a is 0 or an integer from 1 to 3; and b is an integer from 1 to 4, with the proviso that the sum of a and b is 4 to the silica supported titanium/vanadium solid catalyst component during polymerization of said α-olefin.

8. The catalyst system of claim 7 wherein the halosilane compound is selected from the group of halosilanes consisting of trimethylchlorsilane, silicon tetrachloride, and trichlorosilane.

9. The catalyst system of claim 7 wherein the alkylaluminum compound is selected from the group consisting of trialkylaluminum, alkylaluminum halide, alkylaluminum hydride, aluminoxane and mixtures thereof.

10. The catalyst system of claim 9 wherein the alkylaluminum compound is triethylaluminum.

11. The catalyst system of claim 7 wherein the alkylaluminum component and the halosilane component are added to the solid catalyst component in a molar ratio from about 1:1:1 to about 1000:1000:1 based on aluminum:halosilane:solid catalyst.

12. The catalyst system of claim 7 wherein said ROMgX compound is 2-methylpentyloxymagnesium chloride.

13. The catalyst system of claim 7 wherein said compound having the structural formula $TiX^1_p(OR^1)_q$ is selected from the group consisting of tetrahalotitaniums, alkoxytitanium trihalides, dialkoxytitanium dihalides, and mixtures thereof.

14. The catalyst system according to claim 13 wherein p is 4, q is 0, and X is chloride.

15. The catalyst system of claim 14 wherein the titanium compound is titanium tetrachloride.

16. The catalyst system according to claim 7 wherein said vanadium compound having the structural formula $V(OR)_x(O)_y(X^2)_z$ is selected from the group consisting of vanadium oxyhalides, vanadium alkoxides, vanadium carboxylates, vanadium halides and mixtures thereof.

* * * * *